March 5, 1968  W. J. WOOLLEY  3,371,493
SLUICE GATE WITH INFLATABLE RUBBER SEAL
Filed Dec. 14, 1964  4 Sheets-Sheet 2

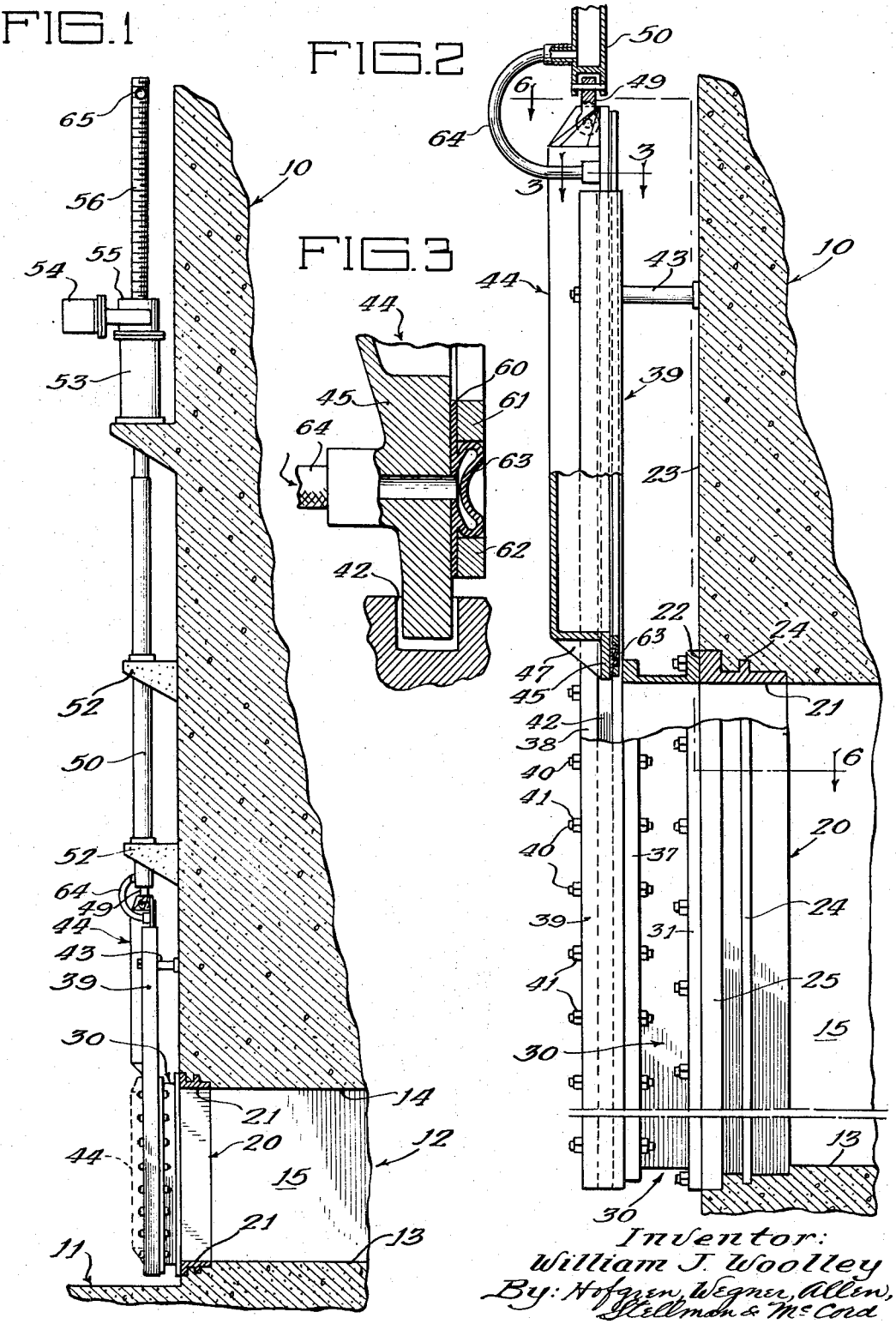

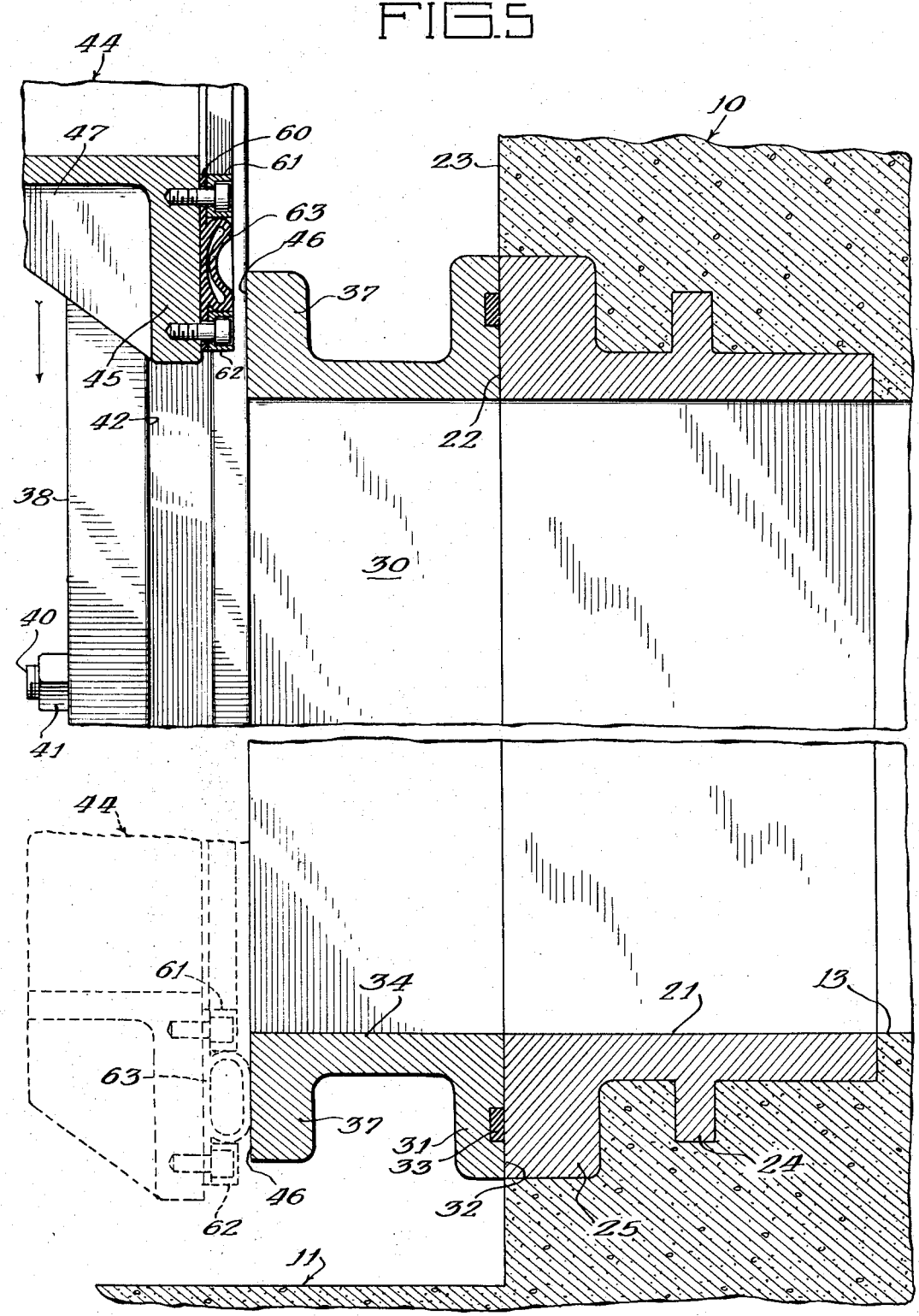

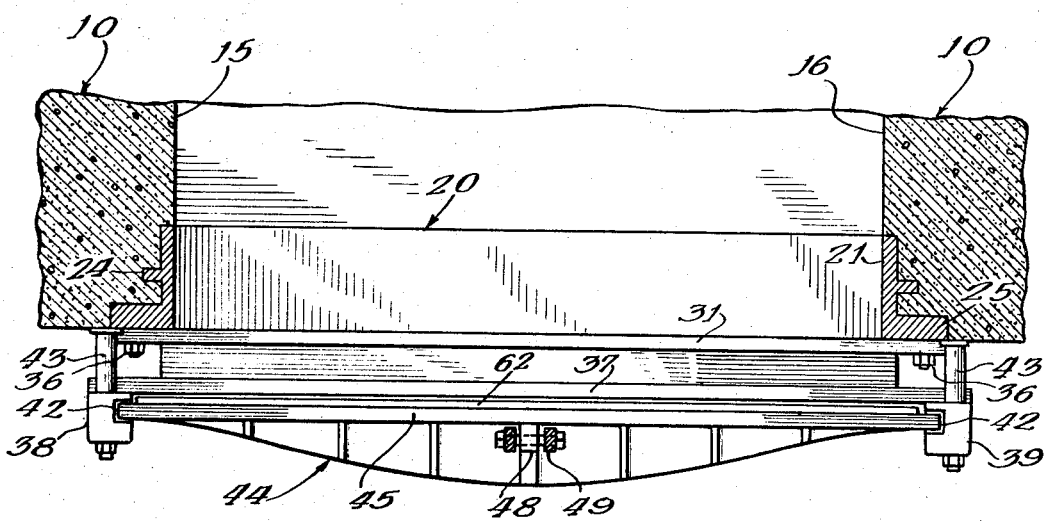
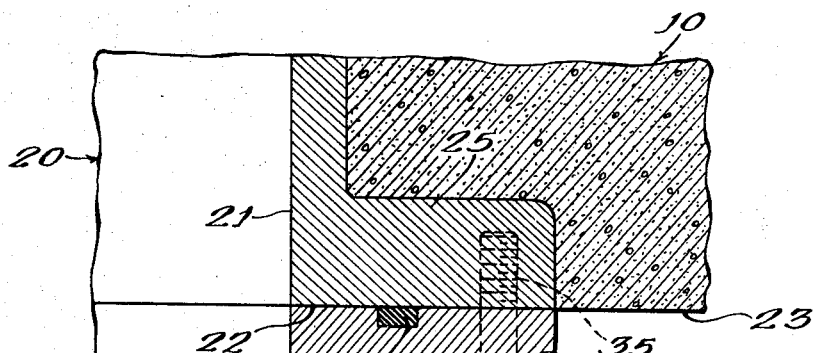

United States Patent Office 3,371,493
Patented Mar. 5, 1968

3,371,493
SLUICE GATE WITH INFLATABLE
RUBBER SEAL
William J. Woolley, Oak Park, Ill., assignor to Henry
Pratt Company, a corporation of Illinois
Filed Dec. 14, 1964, Ser. No. 418,052
3 Claims. (Cl. 61—28)

This invention relates to a sluice gate which is used to control the flow of liquid, generally water or sewage, in water works, sewage and treatment plants, flood control systems and in situations where substantially large flows of liquid are to be controlled.

Sluice gates generally have been of relatively large size for controlling the flow of water through openings in man-made walls or in flow passages. In size, such gates may vary from a two feet by two feet square opening to gates eight feet and ten feet high and as wide. Larger gates have been constructed but these are generally of singular design applied to a particular project. Common sizes of gates are 8 x 10, 6 x 6, and 4 x 8 feet. The present invention will be illustrated with another common size of sluice gate controlling a nine feet wide by six feet high opening in a concrete masonry wall.

Large sluice gates are usually required to withstand a very large static load due to the head of liquid and pressure acting over the area of the gate. Deflections of the gate would be expected under influence of these pressures on a closed gate. Maintaining a seal has been difficult in such an environment. Also, the liquid pressure on the gate tends to frictionally wedge it against whatever retaining structure is provided so that opening a gate from closed position while such pressures are present has required excessively large gate moving machinery.

The principal object of this invention is to provide a new and improved sluice gate structure for liquid flow control.

Another object is to provide a new sluice gate which is fully and freely movable throughout its intended range of travel without substantial friction due to tight relative fits between parts of the gate structure.

An equally important object is to reduce the required weight of a sluice gate by employing a novel sealing structure capable of maintaining a seal even though deflection of the gate may occur under influence of liquid pressure over the area of the gate.

Another object is to make a new sluice gate which is fully closeable against liquid flow and/or leakage in its closed position while permitting free, substantially frictionless movement of the gate into its closed position.

Another object is to make a sluice gate having the qualities specified above while at the same time fully opening the fluid flow passage to its full capacity.

Another object is to make a new sluice gate structure which is economical to build, easily installed without requiring excessive labor and may be easily maintained after installation.

Other objects, features and advantages of the present invention will be obvious from a description of one preferred embodiment illustrated in the accompanying drawings, in which:

FIGURE 1 is a fragmentary side elevational plan view partially in section of a sluice gate of this invention installed upon a concrete masonry wall of a water retaining basin showing the gate in open position in full lines and its closed position in dotted lines;

FIGURE 2 is an enlarged fragmentary view of the lower part of FIGURE 1 showing the gate and associate parts at the level of the water passage to be controlled;

FIGURE 3 is a horizontal fragmentary sectional view through one edge of the gate taken substantially along line 3—3 in FIGURE 2;

FIGURE 5 is an upright fragmentary sectional view taken along line 5—5 in FIGURE 4;

FIGURE 6 is a horizontal fragmentary sectional view taken along line 6—6 in FIGURE 2; and FIGURE 7 is a horizontal fragmentary sectional view taken along line 7—7 in FIGURE 4.

Figure 4:
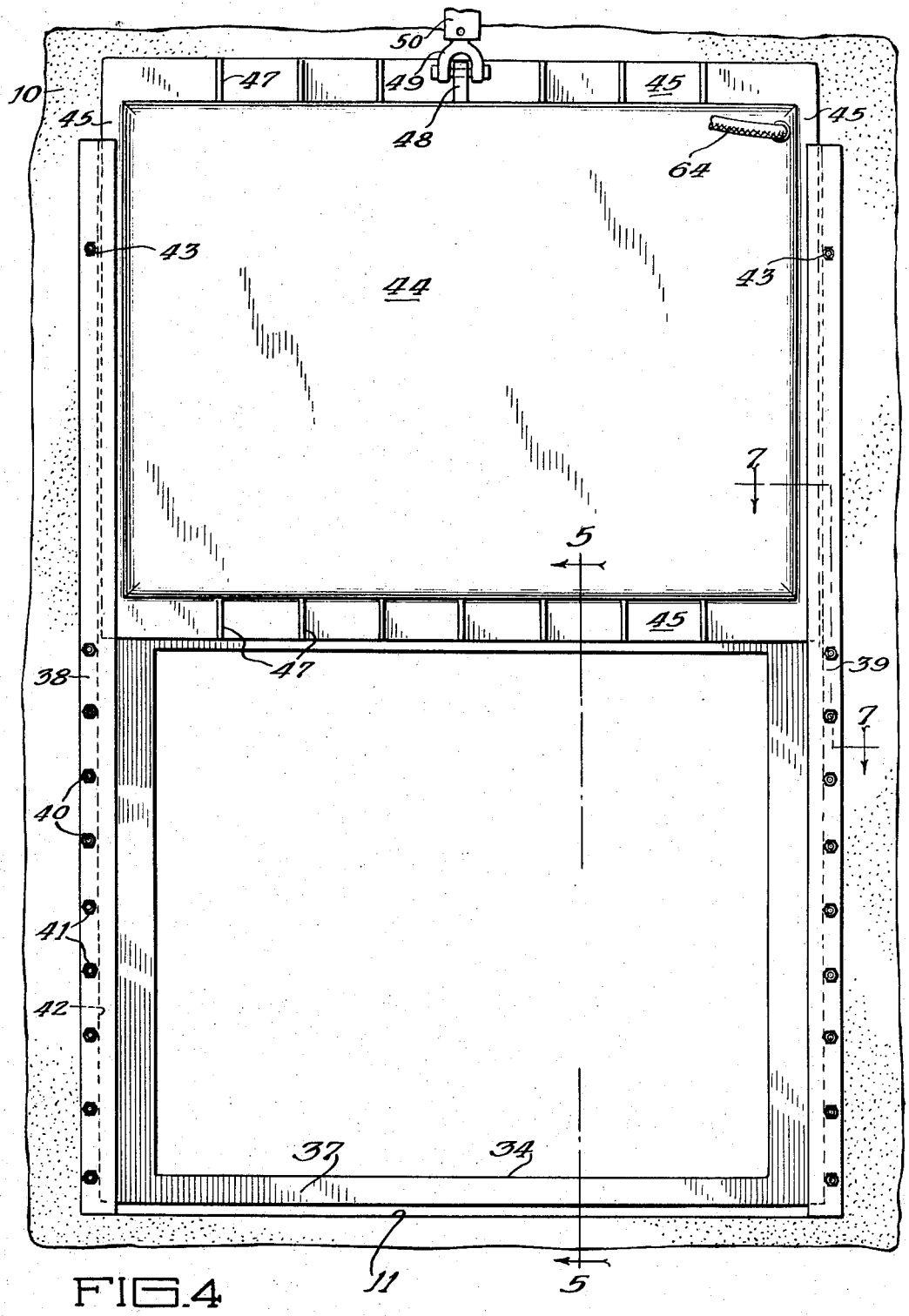
FIGURE 4 is a fragmentary upright plan view of the gate in open position and looking into the water passage to be controlled.

In the figures of the drawings a sluice gate for controlling water flow through an opening in a concrete wall is illustrated. The concrete wall is one wall of a water retaining basin which must be capable of being emptied from time to time as control situations require. In the drawings the wall 10 of the basin is shown as being between two basins, the floor 11 of the left-hand basin being shown in FIGURE 1. A passage 12 is located somewhat below the upper end of the wall 10, the passage having a bottom surface 13, a top surface 14 and opposite side walls 15 and 16. The surfaces which form the passage 12 were generally formed directly through the wall when the wall was poured. Also, when the wall was poured, a wall thimble 20 was embedded in the concrete so that its inner surfaces 21 form continuation of the respective walls of the passage 12. The thimble 20 usually is a large, corrosion-resistant metal casting placed in the wall many months prior to installation of the sluice gate. Such thimbles are of standard construction used extensively in the United States. The thimble has a face 22 flush with the face 23 of the wall 10 when the thimble is secured in place by the poured concrete. The thimble 20 may have a peripheral outwardly extending reinforcing rib 24 spaced from a front flange 25, the latter being thicker and providing the face 23 against which the sluice gate may be mounted.

The concrete forming the basins and passages to be controlled by sluice gates are usually constructed on a particular site some time before the sluice gates are installed. The gates may be purchased from a manufacturer of valves rather than fabricated on the site, all parts except the thimble 20 being so obtained.

In the present invention, the sluice gate comprises the closure, guides for movement of the closure, operator mechanism providing the power necessary to move the closure and a spool piece providing a seat for cooperation with the closure as well as for making connection with the thimble 20.

The spool piece 30 is a rectangular metal member constructed to permit bolting to the thimble as well as bolted mounting of the gate guides on the spool piece. Preferably, the spool piece has one flange 31 with a flat face 32 to abut the outer face 22 of the thimble. Provision is made for containing static sealing material 33 in a groove extending continuously about the passage 34 formed by walls of the spool piece. The standard thimble has tapped holes in the flange 25 to receive threaded studs 35 (FIGURE 7) by which the flange 31 of the spool piece may be fastened in place and held by nuts 36 on the studs. Tightening a number of such nuts (FIGURES 2 and 4) may serve to mount the spool piece onto the thimble so that the passage 34 in the former is in alignment with the water passage through the latter. The studs and nuts are accessible from outside the water passage for such mounting.

The spool piece 30 has another flange 37, rectangular in plan and outwardly extending with the upright portions being sufficiently wide to provide space for mounting upright guide rails 38 and 39 (FIGURES 1, 2 and 4). The upright parts of the flange 37 are provided with bolt holes receiving threaded studs 40 on which nuts 41 are threaded at either end to secure the rails to the spool piece. Such nuts 41 are easily accessible for installation. The rails extend upright, generally parallel, over each side of the spool piece from the bottom to beyond the upper extent of the spool piece a distance generally equal to the height of the water passage. Each rail is a heavy metal section having a gate guiding straight groove 42 from top to bottom. A brace 43 near the upper end of each rail may be provided.

The gate or closure 44 may be cast or fabricated, but in either event, has a continuous rectangular face plate 45 continuous across the top and bottom and on each side with a surface facing the flat face 46 on the flange 37 of the spool piece, when the gate is opposite the spool piece in closed position. It may best be observed in FIGURES 6 and 7 that the upright edges of the side face plate of the gate ride in the grooves in the guide rails loosely. It is intended that there be considerable play between the gate edges and the guide groove so that there is no friction from the fit of the gate and guides together yet the guides confine the movement of the gate to an upright path. As much as one-half inch looseness is built in between the gate and guide groove.

The face plate of the gate is provided with gussets 47 to brace the plate. The center gusset 48 at the top of the gate has a cross pin for attaching a clevis 49 pinned to the lower end of a hollow operator stem 50 by which the gate is raised and lowered. The stem 50 passes through stem guides 52 and up into an operator stand 53 (FIGURE 1). A motor 54 may drive through a gear box 55 operatively connected to the threaded upper extension 56 of the stem for raising and lowering the stem and attached gate. The entire weight of the gate is borne on the stem.

When the gate is lowered so that it spans or bridges the opening in the spool piece, considerable flow can occur around the periphery of the gate member due to the very loose character of the gate in the guides. The pressure of liquid flowing through the liquid passage (right to left in FIGURES 1 and 2) against the gate will force the gate outwardly against the guide rails 38 and 39. The flow will then occur about the top and bottom of the gate primarily. To seal off all flow, an inflatable seal is carried on the peripheral portion of the gate in a position to engage the surface 46 on the spool piece bordering the flow passage 30. The seal is continuous and in this instance should be a rectangular figure slightly in excess of the rectangular size of the flow passage 30.

Referring to FIGURES 3 and 5, the seal is shown as a rubber member having a base plate 60 secured to the gate by overlying metal strips 61 and 62 and appropriate fasteners which cause the base to have a static seal with the face plate 45 of the gate. Midway between the securing plates is an inflatable hollow section 63 shown in its normal deflated position in FIGURE 3. When air or water is admitted into the inflatable part, it extends away from the base plate 60 toward the frame to the dotted line position shown in the lower part of FIGURE 5. The seal is a continuous member and may be connected by suitable hose 64, and the hollow stem 50 and its extension 56 to a position above the operator so that air from a source of air pressure may be connected to the hole 65 in the end of stem extension 56 and used to inflate the seal after the gate has been lowered to a position spanning the flow opening.

A very important feature of the present sluice gate is the cooperation of the gate and its inflatable seal under load conditions. The gate is held only in the side guide rails so is subject to bending loads in-between. Considering that the illustrated gate is nominally nine feet wide and may be subjected to a pressure head of many feet of water or sewage, the load on the gate is very great. In the present construction, bending of the gate will not cause leakage nor spring the guides. The inflatable seal is built to take up the expected bending in the gate between the side rails should water pressure push the center of the top and bottom of the gate away from the top and bottom flange on the spool piece. The grooves in the side rails are only loosely embracing the side edges of the gate so that rotation of the side plates which would accompany the bending mentioned would not bind the gate in the rails.

In operation, the operator may lower the gate 44 to a position opposite the opening in the wall and thereafter inflate the seal which will have the effect of closing off all flow. To open the gate, the seal must first be deflated whereupon it will return to its position as illustrated in FIGURE 3 in full lines automatically. Liquid would flow past the top and bottom of the gate and since the gate is loose, the operator need only lift the weight of the gate against the head of liquid which may be forcing it against the guides. Such friction as is so produced is all the friction opposing the movement of the gate. Once the flow passage through the spool piece is partially opened, the friction between the gate and the guides reduces to a negligible amount, not materially affecting the ability of the operator to move the gate. In lowering the gate into closing position, the weight of the gate itself will aid the operator and the friction on the guides again has little affect upon the ability of the gate to be lowered.

While the inflated seal has been illustrated as mounted against the flat face of the gate closure member, it will be recognized that the seal is inflated and operative only when the gate is in closed position so that the seal may equally effectively be mounted on the frame members bordering the flow opening, or mounted in a groove in the face plate of the gate as well as extending outwardly from the face plate as illustrated.

The foregoing detailed description has been given for clearness of understanding only and no unnecessary limitations should be understood therefrom as some modifications will be obvious to those skilled in the art.

I claim:

1. A sluice gate structure for attachment to an exposed face of a thimble mounted in a wall, comprising:

a guide and closure unit having a pair of spaced upright guide rails and a closure loosely mounted for movement transversely of the faces of said closure and for linear movement between and along the guide rails, one face of said closure having a flat face immediately inside the guide rails and surrounding the central portion of the closure, said guide rails having stop means engageable with the face of said closure opposite said one face to limit the movement transversely of said flat face when the closure is positioned to seal against fluid flow;

a tubular base structure having an internal flow passage for fluid and outwardly extending structural parts for receiving said guide and closure unit, said guide rails being removably attachable to the base structure with externally operable attachment means, said base structure having a flange with an abutment face surrounding said passage and directly facing said flat face when the closure is positioned to seal the fluid flow;

an inflatable seal member carried on at least one of the closure flat face and the flange abutment face and extending peripherally of the flow passage inside said rails, said seal being inflatable when the closure is positioned over the passage to seal the periphery of the passage between the closure and base structure;

and externally operable attachment means for securing said base structure to said thimble to align said fluid passage with the thimble and position said guide and closure unit in position to open and close said passage.

2. A sluice gate structure as specified in claim 1 wherein said closure is supported against head pressure within said flow passage only by said stop means so that said closure may bend between the rails under influence of such pressure, said seal being continuous about the periphery of the passage and distensible to maintain sealing contact between the base structure flange and flat face of the closure during such bending.

3. A sluice gate structure as specified in claim 1 in which the closure hangs upon a supporting operator stem for raising and lowering the closure, the stop means of each said guide rails having an upright slot facing inwardly and the closure having an upright plate edge extending into each slot with clearance for free motion of the closure in the guide rails when the seal is deflated.

References Cited
UNITED STATES PATENTS

| | | | |
|---|---|---|---|
| 1,868,147 | 7/1932 | Kruse | 251—172 |
| 2,240,049 | 4/1941 | Murphy | 61—28 |
| 2,643,521 | 6/1953 | Hatch | 61—28 |
| 2,683,354 | 7/1954 | Harza | 61—28 |

FOREIGN PATENTS 251,488   8/1948   Switzerland.

EARL J. WITMER, *Primary Examiner*